United States Patent [19]

Lee et al.

[11] Patent Number: 5,521,772
[45] Date of Patent: May 28, 1996

[54] DISK DRIVE WITH ACCELERATION RATE SENSING

[75] Inventors: Chih-Kung Lee, Cupertino; Archibald C. Munce, Jr.; Timothy C. O'Sullivan, both of San Jose, all of Calif.

[73] Assignee: International Business Machines Corporation, Armonk, N.Y.

[21] Appl. No.: 159,878

[22] Filed: Nov. 30, 1993

[51] Int. Cl.$^6$ .................................................. G11B 21/20
[52] U.S. Cl. .............................. 360/75.000; 360/69.000
[58] Field of Search ................................. 360/60, 69, 75, 360/31

[56] References Cited

U.S. PATENT DOCUMENTS

| | | | |
|---|---|---|---|
| 4,040,103 | 8/1977 | White | 360/75 |
| 4,862,298 | 8/1989 | Genheimer et al. | 360/75 |
| 4,868,447 | 9/1989 | Lee et al. | 310/328 |
| 4,947,093 | 8/1990 | Dunstan et al. | 318/560 |
| 4,967,293 | 10/1990 | Aruga et al. | 360/78.12 |
| 5,227,929 | 7/1993 | Comerford | 360/75 |
| 5,235,472 | 8/1993 | Smith | 360/69 |
| 5,257,255 | 10/1993 | Morimoto et al. | 360/60 |
| 5,299,075 | 3/1994 | Hanks | 360/75 |
| 5,333,138 | 7/1994 | Richards et al. | 360/75 |

FOREIGN PATENT DOCUMENTS

| | | | |
|---|---|---|---|
| 0165755 | 12/1985 | European Pat. Off. | G11B 5/55 |
| 0217460 | 4/1987 | European Pat. Off. | G11B 7/09 |
| 0264535 | 4/1988 | European Pat. Off. | G11B 5/596 |
| 60-35377 | 2/1985 | Japan | G11B 21/08 |
| 60-121578 | 6/1985 | Japan | G11B 21/10 |
| 61-170967 | 8/1986 | Japan | G11B 21/10 |
| 61-170936 | 8/1986 | Japan | G11B 7/12 |
| 63-152070 | 6/1988 | Japan | G11B 21/12 |
| 63-213176 | 9/1988 | Japan | G11B 21/10 |
| 0143881 | 2/1989 | Japan | G11B 21/10 |
| 0173579 | 3/1989 | Japan | G11B 21/10 |
| 1204276 | 8/1989 | Japan . | |
| 02214074 | 8/1990 | Japan | G11B 21/08 |
| 03207063 | 9/1991 | Japan | G11B 21/10 |
| 03252962 | 11/1991 | Japan | G11B 19/02 |
| 04123374 | 4/1992 | Japan | G11B 21/10 |
| 04161834 | 6/1992 | Japan | G01L 5/00 |
| 04172669 | 6/1992 | Japan | G11B 21/10 |
| 05135365 | 6/1993 | Japan . | |

OTHER PUBLICATIONS

T. J. Chainer et al., "Self-calibrating Apparatus for Piezoelectric Shock Sensors in DASD", IBM Technical Disclosure Bulletin, vol. 35, No. 5, Oct. 1992, pp. 398–399.
Ottesen, "Apparatus for Detecting and Correcting Excessive Vibration in a Disk File", IBM Technical Disclosure Bulletin, vol. 30, No. 6, Nov. 1987, pp. 81–82.
Sri-Jayantha, "Servo Angular Accelerometer for Detection and Measurement", IBM Technical Disclosure Bulletin, vol. 36, No. 06A, Jun. 1993, p. 187.
Sri-Jayantha, "Integrated Micro-VCM Lock as Write Inhibit Generator", IBM Technical Disclosure Bulletin, vol. 35, No. 2, Jul. 1992, pp. 207–208.

*Primary Examiner*—Aristotelis Psitos
*Assistant Examiner*—Larry T. Cullen
*Attorney, Agent, or Firm*—Thomas R. Berthold

[57] ABSTRACT

A data recording disk drive includes acceleration rate sensing for controlling or modifying one or more disk drive operations in response to external shock or vibration. An acceleration rate sensor is mounted on the disk drive housing and provides direct detection of acceleration rate of the disk drive when subjected to external shock or vibration. The sensor includes two spaced-apart piezoelectric transducers that operate in current mode. The transducers are connected to an interface circuit that generates two voltage signals that are directly proportional to the angular and linear acceleration rates, respectively, when the disk drive is subjected to an external force. The disk drive microcontroller uses the voltage signals to inhibit writing of data or modify the servo control signal to maintain the heads on track during track seeking or following. The microcontroller can also combine the two signals to determine the acceleration rate of an unbalanced rotary actuator, which can then be used to modify the servo control signal. This permits the use of an unbalanced rotary actuator, which makes the disk drive smaller and lighter and reduces power consumption.

15 Claims, 3 Drawing Sheets

5,521,772

DISK DRIVE WITH ACCERLERATION RATE SENSING

TECHNICAL FIELD

This invention relates in general to data recording disk drives, and more particularly to magnetic recording disk drives that use shock or vibration sensing to modify certain drive operations, such as inhibiting the reading or writing of data.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read and write operations. The most common form of actuator is a rotary voice coil motor (VCM) actuator that moves the head carrier in a nonlinear, generally arcuate path across the disk. There are typically a number of disks mounted on a hub that is rotated by a disk drive motor, and a number of head carriers connected to the actuator for accessing the surfaces of the disks. A housing supports the drive motor and head actuator and surrounds the heads and disks to provide a substantially sealed environment. In conventional magnetic recording disk drives, the head carrier is an air-bearing slider that rides on a bearing of air above the disk surface when the disk is rotating at its operational speed. The slider is maintained next to the disk surface by a biasing force from a suspension that connects the slider to the actuator.

In contrast to conventional air-bearing disk drives, contact or near-contact disk drives have been proposed that place the head carrier in constant or occasional contact with the disk or a liquid film on the disk during read and write operations. Examples of these types of disk drives are described in IBM's U.S. Pat. No. 5,202,803 and published European application EP 367510; U.S. Pat. No. 5,097,368 assigned to Conner Peripherals; and U.S. Pat. No. 5,041,932 assigned to Censtor Corporation.

Disk drives are sensitive to external shock and vibration that can cause the heads to move to the wrong track during a track accessing or "seek" operation or to move off track during a read or write operation. The writing of data on the wrong track is unacceptable because it usually results in the loss of data on the track that is written over. Various techniques have been proposed to address this problem by sensing the external force and either compensating for it or shutting down some operation of the disk drive until the force is removed. These techniques typically involve the use of conventional accelerometers mounted to the disk drive housing. European published patent application EP 264535, assigned to Hewlett-Packard, describes a disk drive that uses accelerometer output as feedback into the actuator tracking control or servo system to compensate for shock or vibration-induced tracking errors. Japanese published patent application JP 03-252962, assigned to NEC Corporation, describes a disk drive that uses accelerometer output to move the heads to a parking zone and stop rotation of the disk drive motor when the accelerometer output exceeds a predetermined value.

As disk drives become smaller and their track density (i.e., number of data tracks per radial inch) increases, the effect of external shock and vibration becomes more pronounced. This is especially true in rotary actuator disk drives when the external force is in a direction that would cause the actuator to rotate. What is needed is a disk drive having a sensing device that produces a more rapid and reliable response than conventional accelerometers to external forces to maintain the heads on track and/or inhibit the writing of data on the wrong track.

SUMMARY OF THE INVENTION

The present invention is a disk drive that includes acceleration rate sensing for controlling or modifying one or more disk drive operations in response to external shock or vibration. The invention is based on the observation that in the typical magnetic recording disk drive environment, the initial off-track displacement of the head from the data track due to an external force is proportional to the rate of change of acceleration, and not the acceleration itself.

In the preferred embodiment, an acceleration rate sensor is mounted on the disk drive housing. The sensor includes two spaced-apart piezoelectric transducers that operate in current mode. The transducers are connected to an interface circuit that generates two voltage signals that are directly proportional to the angular and linear acceleration rates, respectively, when the disk drive is subjected to an external force. The disk drive microcontroller uses the voltage signals to inhibit writing of data or modify the servo control signal to maintain the heads on track during track seeking or following. The microcontroller can combine the two signals to determine the acceleration rate of the rotary actuator, which can then be used to modify the servo control signal. This permits the use of an unbalanced rotary actuator, which makes the disk drive smaller and lighter and reduces power consumption.

For a fuller understanding of the nature and advantages of the present invention, reference should be made to the following detailed description taken together with the accompanying figures.

DESCRIPTION OF THE PREFERRED EMBODIMENTS

Figure 1:
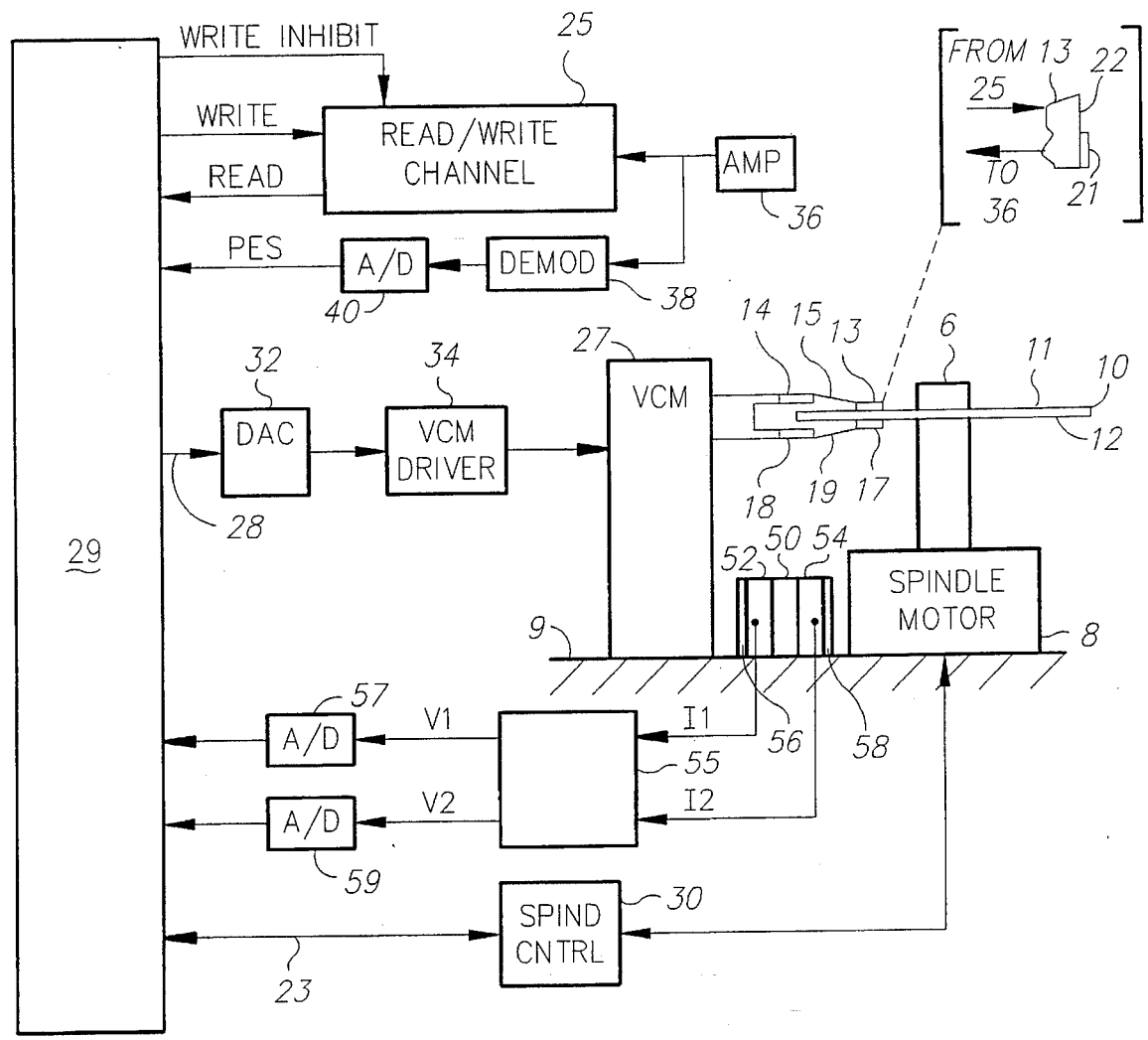
FIG. 1 is a block diagram of a magnetic recording disk drive incorporating the present invention.

A disk drive incorporating the present invention is shown schematically in FIG. 1.

A magnetic recording disk 10, having "top" 11 and "bottom" 12 surfaces, is supported on a spindle 6 and rotated by the drive or spindle motor 8. The magnetic recording media on each disk surface 11, 12 is in the form of an annular pattern of concentric data tracks (not shown).

A head carrier 13 is positioned on the top surface 11 of disk 10. Carrier 13 is an air-bearing slider having an air-bearing surface (or disk side 20) facing toward the disk, and a trailing end 22. The head carrier 13 supports a read/write transducer 21 on its trailing end 22 for reading and writing data to the magnetic media on disk surface 11. The transducer 21 may be an inductive read/write head or a dual element head having an inductive write element and a magnetoresistive read element. The carrier 13 may be a three-rail, air-bearing slider of the type described in IBM's U.S. Pat. No. 4,894,740, with the transducer 21 being located on the trailing end of the center rail. Carrier 13 is attached to an actuator arm 14 by means of a suspension 15. The suspension 15 provides a slight spring force that biases the carrier 13 toward the disk surface 11. A second carrier 17, also supporting a read/write transducer, is positioned on the bottom surface 12 of disk 10 and is attached to an actuator arm 18 by means of a suspension 19.

Actuator arms 14, 18 are attached to a rotary actuator 27. The actuator is typically a rotary voice coil motor (VCM) that comprises a coil movable within a fixed magnetic field, the direction and velocity of the coil movements being controlled by motor current signals supplied by a microcontroller 29. As the disk 10 rotates, the rotary actuator 27 moves the carriers 13, 17 in a generally arcuate path radially in and out over their respective disk surfaces 11, 12 so that the read/write transducers may access different portions of the disk surfaces where data is desired to be read or recorded. Both the actuator 27 and spindle motor 8 are mounted to a portion of the disk drive housing 9.

In this conventional type of air-bearing disk drive, the rotation of the disk 10 generates an air bearing between the carrier 13 and its associated disk surface 11. During operation of the disk drive, the air bearing thus counterbalances the slight spring force of the suspension 15 and supports the carrier 13 off and slightly away from the disk surface 11 by a small, substantially constant spacing. The present invention is also applicable to other types of disk drives, however, such as contact or near-contact recording disk drives, where the head carrier is urged into contact with the disk during read and write operations.

The various components of the disk drive are controlled in operation by control signals generated by microcontroller 29. Typically, the microcontroller 29 comprises logic control circuits, memory storage, and a microprocessor, for example. The microcontroller 29 generates control signals for various drive operations, such as spindle motor control signals on line 23 and track following and seek control signals on line 28 for actuator 27.

The spindle motor control signals on line 23 are sent to spindle controller 30 that controls the current to the armatures of spindle motor 8 to rotate the motor at a constant rotational speed during drive operation. Spindle controller 30 also provides status signals to microcontroller 29, e.g., a speed signal indicating that spindle motor 8 has achieved operational speed.

The track following and seek control signals on line 28 are generated by microcontroller 29 that runs a servo control algorithm in response to input head position error signals (PES). The head 21 reads head position servo information recorded on the disk, typically at equally angularly spaced servo sectors embedded between the data sectors. Those signals are amplified by read amplifier 36, demodulated by demodulator 38, and converted to the digital PES by analog-to-digital (A/D) converter 40. The track following and seek control signals on line 28 are sent to digital-to-analog converter (DAC) 32 that converts them to analog voltage signals which are output to VCM driver 34. VCM driver 34 then sends corresponding current pulses to the coil of actuator 27 to pivot the arms 14, 18 radially inward and outward to optimally move and position the carriers 13, 17 to the desired data track on the respective disk surfaces 11, 12.

Data from disk surface 11 is read by the read/write head 21, amplified by amplifier 36, and sent to the read/write channel 25. Write signals are sent through read/write channel 25 to head 21 for writing data on disk surface 11.

In the present invention, an acceleration rate sensor 50 is mounted to the disk drive housing 9. Rate sensor 50 includes spaced-apart piezoelectric transducers (PZT) 52, 54 and seismic mass plates 56, 58 attached to PZTs 52, 54, respectively. Sensor 50 provides two output currents I1, I2 from PZTs 52, 54, respectively, that are directed to an interface circuit 55. Interface circuit 55 provides two output voltage signals V1, V2, corresponding to I1, I2 input signals, that are converted by A/D converters 57, 59 and input to microcontroller 29. Unlike conventional accelerometers, sensor 50 directly detects the rates of change of acceleration along one or more axes. The microcontroller 29 uses the detected acceleration rates to generate a write inhibit signal to read/write channel 25 when the acceleration rate exceeds a predetermined value. The predetermined value that serves as the threshold for triggering the write inhibit is a constant either stored in a memory device addressable by microcontroller 29 or incorporated into microcode as part of the control algorithm. Alternatively, the V1, V2 outputs of sensor 50 can be sent to comparators having fixed values and the comparator outputs sent to A/D converters 57, 59 to reduce computation time in microcontroller 29. In addition to generating the write inhibit signal, the microcontroller 29 can use the acceleration rate signal in the servo control algorithm to compensate for external shocks and vibration to maintain the heads on the desired data tracks.

Figure 2:
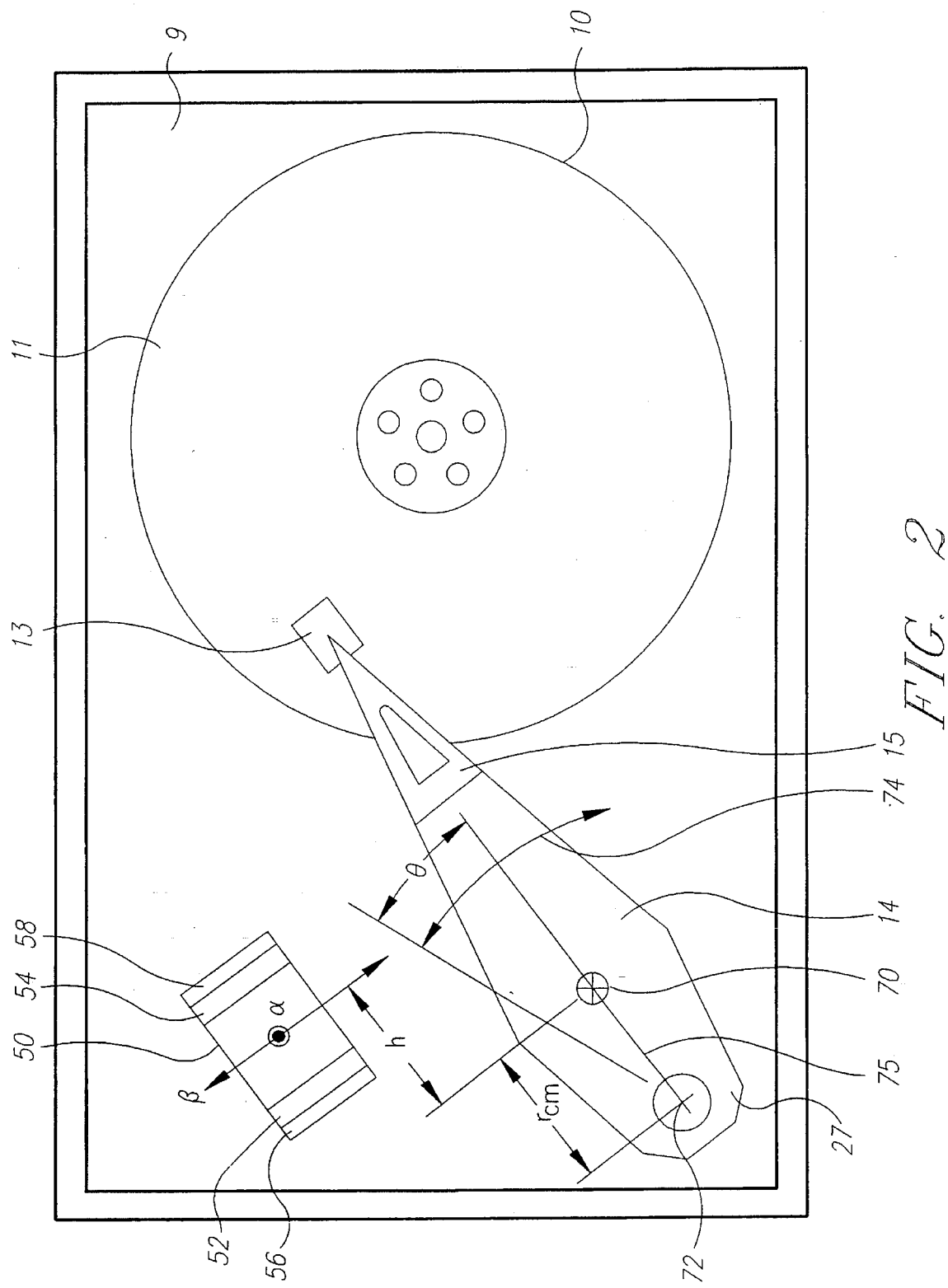
FIG. 2 is a top view of the disk drive with the housing cover removed illustrating the position of the acceleration rate sensor relative to an unbalanced rotary actuator.

FIG. 2 is a top view of the disk drive with the housing cover removed and illustrates the position of sensor 50 relative to actuator 27. The actuator 27 shown in FIG. 2 is an unbalanced rotary actuator in that it has its center of mass 70 located a distance $r_{cm}$ from its axis of rotation 72. In contrast, a balanced rotary actuator typically includes a counterweight on the back side of axis 72 to balance the weight of arm 14 and head carrier 13 so that the center of mass coincides with the axis of rotation 72. Actuator 27 pivots on axis 72 through an angle θ to move the head carrier 13 radially inward and outward in a generally arcuate direction 74 across the surface 11 of disk 10.

The acceleration rate sensor 50 is secured to the base of housing 9 so that the plates of PZTs 52, 54 (and their poling directions) are aligned parallel to an axis β that is generally parallel to the direction 74 (generally perpendicular to the centerline 75 of arm 14 when the head carrier 13 is at the middle of the data band on disk surface 11). The center of sensor 50 is aligned through an axis α parallel to axis of rotation 72 of actuator 27. The axis a of sensor 50 is located a distance h from the actuator center of mass 70 along an axis generally perpendicular to axis β.

Figure 3:
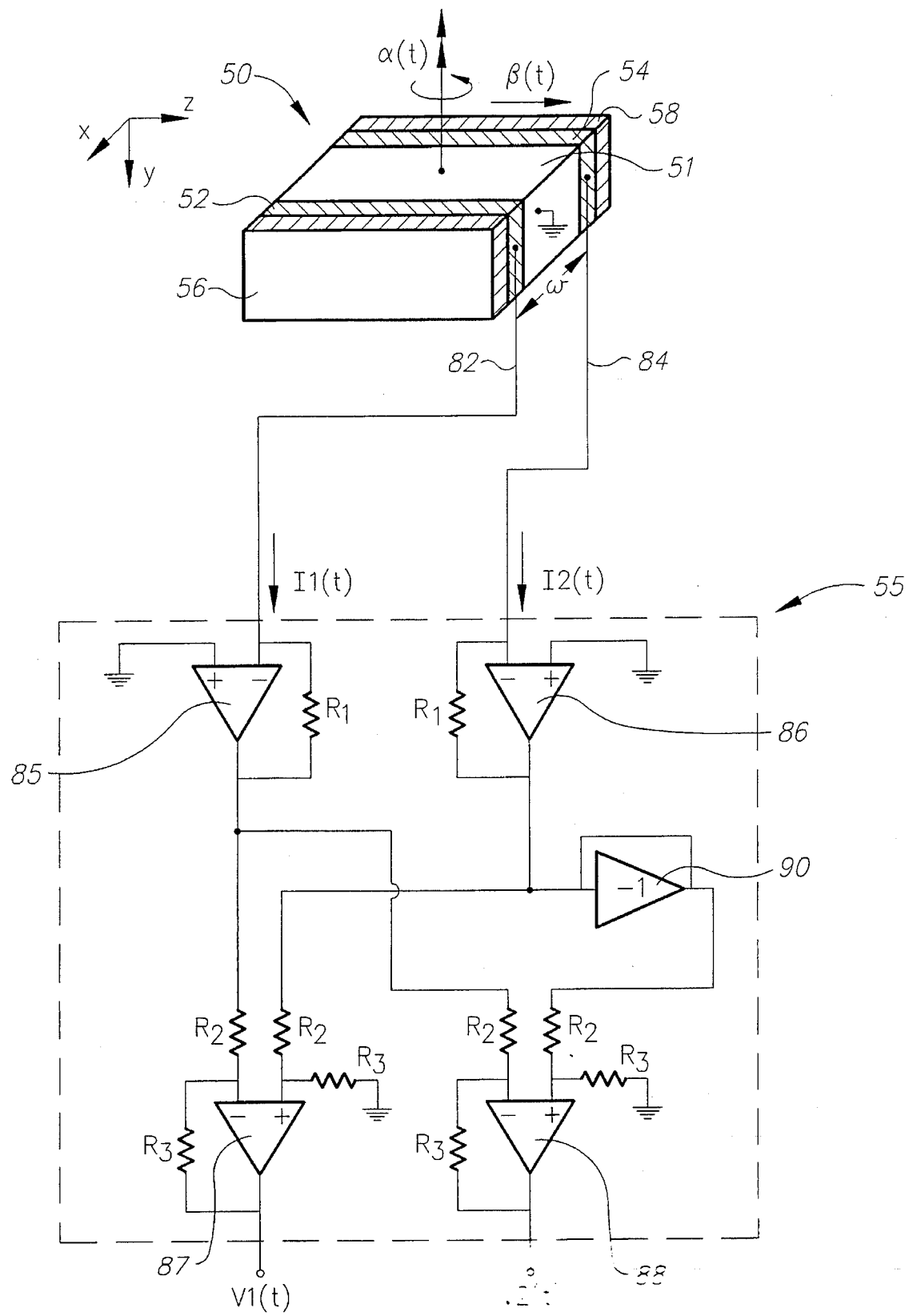
FIG. 3 illustrates the component parts of the acceleration rate sensor and its interface circuit.

Referring now to FIG. 3, the operation of sensor 50 with interface circuit 55 will be described to explain the manner in which the output of PZTs 52, 54 are used to directly detect angular and linear acceleration rates.

The PZTs 52, 54 are plates of conventional lead-zirconate-titanate material having their poling directions parallel to the β axis direction, which is generally perpendicular to the actuator arm axis 75 (FIG. 2). The PZTs 52, 54 are bonded to the parallel sides of a stainless steel block 51 that is secured to the base of housing 9, and are spaced apart a distance w. The center of block 51 and thus sensor 50 has a central axis in the α direction, which is parallel to pivot axis 72 of actuator 27 (FIG. 2). Plates of stainless steel or other suitable material serve as seismic mass plates 56, 58 and are bonded to PZTs 52, 54, respectively.

As will be explained, the current signals I1, I2 from each of the PZTs 52, 54, respectively, are proportional to the combination of rates of change of angular (α) and linear (β) acceleration when an external shock is present. The current signals I1, I2 are fed into the interface circuit 55 through leads 82, 84 that are attached to the nongrounding surface electrodes of the PZTs 52, 54, respectively. Interface circuit 55 is made up of operational amplifiers 85, 86, 87, 88; unity gain inverting amplifier 90; and feedback resistors R1, R2, R3. By adjustment of the gains for the various stages of the interface circuit 55, the output voltage signals V1, V2 obtained are each made proportional to one of the angular and linear acceleration rates, as described as follows.

The electric displacement D of a piezoelectric material, such as that used in PZTs 52, 54, can be written as:

$$D_1 = d\tau_{xz} + \epsilon_{11} E_1 \tag{1}$$

where $\tau_{xx}$ is the in-plane shear stress along the z axis and acts on a plane whose normal is in the x direction (see xyz coordinate system in FIG. 3), d is the piezoelectric strain/charge constant in the xz plane, c denotes the permittivity constant of the piezoelectric material, E is the electric field, and the subscripts 1–3 represent x, y, z. The current I1(t) generated within PZT 52 is given by:

$$I1(t) = \frac{d}{dt} \int_s (d\tau_{xz} + \epsilon_{11} E_1) dy dz \tag{2}$$

where the integration is over the surface S of the PZT 52. Since the current amplifier 85 acts as a virtual ground, the electric field E is nulled so that this term can be dropped from Eq. (2), and thus all of the current detected can be attributed to the stress rate induced in the PZT 52 due to the external force. For the sensor shown in FIG. 3, the shear stress $\tau_{xx}$ is $$\tau_{xz} = \frac{w}{2} \cdot K\alpha + K\beta \tag{3}$$

where K is a constant determined from the densities and thicknesses of the seismic mass plate 56 and PZT 52, $\alpha = \alpha(t)$ and $\beta = \beta(t)$ are the angular and linear accelerations of interest. Substituting Eq. (3) into Eq. (2) yields:

$$I1(t) = \tag{4}$$
$$\left[ \frac{w \cdot d}{8} \cdot \left( m_s + \frac{m_p}{2} \right) \right] \frac{d\alpha}{dt} + \left[ d \left( m_s + \frac{m_p}{2} \right) \right] \frac{d\beta}{dt}$$

Similarly, where $m_s$ and $m_p$ are the masses of the seismic mass plate 56 and PZT 52, respectively, the governing equation for the current signal generated from PZT 54 is $$I2(t) = \tag{5}$$
$$-\left[ \frac{w \cdot d}{8} \left( m_s + \frac{m_p}{2} \right) \right] \frac{d\alpha}{dt} + \left[ d \left( m_s + \frac{m_p}{2} \right) \right] \frac{d\beta}{dt}$$

Thus, the signal V1(t) output from interface circuit 55 in FIG. 3 is $$V1(t) = \tag{6}$$
$$\frac{R_3 R_1}{R_2} [I1(t) - I2(t)] = \frac{R_3 R_1}{R_2} \left[ \frac{w \cdot d}{4} \left( m_s + \frac{m_p}{2} \right) \right] \frac{d\alpha}{dt}$$

which indicates that the sensor 50 provides a low impedance output voltage signal V1(t) that is linearly proportional to just the angular acceleration rate dα/dt. Similarly, the voltage signal V2(t) from interface circuit 55 in FIG. 3 is $$V2(t) = \tag{7}$$
$$\frac{R_3 R_1}{R_2} [I1(t) + I2(t)] = \frac{R_3 R_1}{R_2} \left[ 2d \left( m_s + \frac{m_p}{2} \right) \right] \frac{d\beta}{dt}$$

which is linearly proportional to just the linear acceleration rate dβ/dt.

Since the rate of stress within each of the PZTs 52, 54 is linearly proportional to one of the acceleration rates for the mechanical configuration designed, an angular and linear acceleration rate sensor is achieved that detects angular and linear acceleration rates directly. More specifically, if all the resistors R1, R2, R3 in the interface circuit 55 have the same value, the angular acceleration rate is the voltage signal V1 divided by a constant. That constant is a function of the mass of seismic mass plate 56, the mass of PZT 52, the piezoelectric constant, and the separation distance w of the two PZTs 52, 54. Similarly, the linear acceleration rate is the voltage signal V2 divided by a different constant. That constant is a function of all the parameters that influence the measurement of V1, excluding w.

The output voltage signals V1, V2 are converted to digital signals by A/D converters 57, 59, respectively (FIG. 1), and input to microcontroller 29. The microcontroller 29 can use these digital signals to perform or modify a number of disk drive operations when the digital values, or some combination of them, exceed a predetermined value. For example, if the digital value corresponding to V1 exceeds a predetermined value (a constant either stored in a memory accessed by microcontroller 29 or written into the microcode), thus indicating an excessive angular rate of change of acceleration, a write inhibit command is sent to read/write channel 25 to prevent the writing of data on the wrong track.

The ability to simultaneously obtain angular and linear acceleration rates allows for the unique capability of selecting the weighted combination of these outputs for use with unbalanced rotary actuators. For a balanced rotary actuator whose center of mass is located at its pivot point, linear accelerations in the plane parallel to the disk will not produce any relative displacement of the head from the data track. For a small disk drive, much of the mass and inertia of the actuator is located in the arms, suspensions, and sliders. In such a drive, a counterweight must be placed on the opposite side of the actuator pivot point to balance the actuator. This type of balancing has the penalty of increasing inertia, and hence reducing access time and/or increasing power requirements. However, for unbalanced rotary actuators, as shown in FIG. 2, where the center of mass 70 is located a distance $r_{cm}$ from the pivot point 72, there will be an angular reaction force to an in-plane linear acceleration. For this case, the acceleration rate sensor 50 output is a combination of angular and linear acceleration rates that are weighted by the relative inertia effects these two accelerations have on off-track displacement. The effective angular acceleration rate for an unbalanced rotary actuator is $$\frac{d^3}{dt^3}(\theta) = -\left( 1 + \frac{Mhr_{cm}}{I} \right) \frac{d\alpha}{dt} + \left( \frac{Mr_{cm}}{I} \right) \frac{d\beta}{dt} \tag{8}$$

where α is the angular acceleration, β is the linear acceleration normal to the axis 75 of the arm 14, M is the mass of the rotary actuator, and I is the moment of inertia of the rotary actuator about its pivot point 72. Eq. (8) shows that the angular acceleration rate for an unbalanced rotary actuator is directly related to V1 and V2 for the interface circuit 55, since dα/dt and dβ/dt can be substituted with terms that are constants times V1 and V2, respectively, from Eqs. (6) and (7). Thus, it is possible in the present invention for the microcontroller 29 to use the digital values of V1 and V2 in the servo control algorithm to rapidly anticipate and compensate for external forces, especially those in-plane forces, in a disk drive with an unbalanced rotary actuator. For a typical VCM 27 used in today's disk drives (see FIG. 1), the angular acceleration $d^2\theta/dt^2$ exerted by VCM 27 to the slider 13 is proportional to the actuator current $I_a$. The $d^3\theta/dt^3$ shown in Eq. (8) measures the time derivative of the actuator angular acceleration (the angular acceleration rate) when an external excitation is applied to an unbalanced actuator. Therefore, if the microcontroller 29 modifies the actuator current $I_a$ to overcome the external shock or vibration present, which is accomplished by adding a term to the actuator control current equal to $d^3\theta/dt^3$ multiplied by a constant gain factor, the angular acceleration rate of the unbalanced actuator can then be controlled. This action constitutes a damping control and thus increases the robustness of the disk drive in a shock or vibration prone environment, such as notebooks and other portable computers. As a result, the disk drive can be made without the penalties of increased weight, reduced access time and/or increased power requirements that are necessary in a balanced rotary actuator disk drive.

In the typical magnetic recording disk drive environment, the initial off-track displacement of the head from the data track will be proportional to the time derivative of the acceleration, i.e., the rate of change of acceleration, and not the acceleration itself. For the disk drive to be able to inhibit writing, or move the actuator to a safe location, or do track seeking or following, all in the presence of external shocks and vibration, it is necessary to sense the external forces as early as possible. This is especially the case as the track density (i.e., the number of data tracks per radial inch) continues to increase in disk drives. A general forcing function representing the external shock can be expanded into a combination of the zero order term (the force magnitude at time equals zero), the first order term (the force component that grows linearly with time), and all of the higher order terms. For a realistic shock force that can appear in a magnetic disk drive, the zero order term is zero (because the shock possesses the nature of having zero initial force) while the first order term increases rapidly with time. Thus, a shock signal at a detecting sensor in the disk drive will be dominated by the first order term when the shock just arrives at the sensor. Essentially, this means that the only term that is nonzero at time equals zero is the acceleration rate. More specifically, the realistic shock force mentioned above can be expressed as:

$$f(t \to 0^+) = \frac{df}{dt}(t \to 0^+)t + \frac{d^2f}{dt^2}(t \to 0^+)\frac{t^2}{2!} + \frac{d^3f}{dt^3}(t \to 0^+)\frac{t^3}{3!} + \cdots \quad (9)$$

where $0^+$ represents the time immediately after the shock arrives. The displacement of slider 13 (FIG. 1), in response to this shock force, can be easily shown to be $$x(t \to 0^+) = \frac{1}{6M_s} \cdot \frac{df}{dt}(t \to 0^+)t^3 + \frac{1}{24M_s} \cdot \frac{d^2f}{dt^2}(t \to 0^+)t^4 + \cdots \quad (10)$$

where $M_s$ is the effective mass. Therefore, it is clear from Eq. (10) that the acceleration rate, $$\frac{d^3x}{dt^3}(t \to 0^+),$$

is the lowest order nonzero term when the shock just arrives, i.e., $t \to 0^+$.

Since it is desirable to be able to detect the shock as early as possible, the present invention, which allows direct detection of acceleration rates, provides a significant advantage over disk drives that use conventional accelerometers.

In addition to the improved response time due to the direct detection of acceleration rate, the present invention provides an additional advantage over disk drives that use conventional accelerometers. The piezoelectric transducer used for acceleration rate sensing can be interfaced in current mode, as shown in FIG. 3, as opposed to voltage mode that is required if the piezoelectric transducer is to sense acceleration. This difference is important because the current mode results in lower impedance and thus an improvement in electromagnetic interference (EMI) sensitivity.

It should be noted that it is within the scope of the present invention for the detection of acceleration rate to be accomplished by using digital signal processing performed within the microcontroller 29 by feeding back regular acceleration signals obtained from one or more conventional accelerometers. This may be acceptable provided the processing time is sufficiently fast so there is no lag between the time of the external shock and the time for the disk drive to respond with a write inhibit or other function. However, taking the derivative electronically on the acceleration signal will introduce more noise so that the direct detection of acceleration rate is the preferred method.

While the preferred embodiments of the present invention have been illustrated in detail, it should be apparent that modifications and improvements may be made to the invention without departing from the spirit and scope of the invention as described in the following claims.

What is claimed is:

1. A data recording disk drive comprising:
   a data disk having tracks for the recording of data;
   a motor connected to the disk for rotating the disk;
   a transducer for reading data from or writing data to the tracks;
   a carrier for supporting the transducer near the surface of the disk;
   an actuator connected to the carrier for moving the carrier and supported transducer across the tracks and for maintaining the transducer on a desired track;
   an acceleration rate sensor for detecting the rate of change of acceleration of the disk drive in response to an external force; and
   means for supporting the motor, actuator, and acceleration rate sensor.

2. The disk drive according to claim 1 further comprising means electrically coupled to the transducer and the acceleration rate sensor for inhibiting the reading or writing of data when the detected acceleration rate exceeds a predetermined value.

3. The disk drive according to claim 1 further comprising means electrically coupled to the actuator and the acceleration rate sensor for adjusting the position of the transducer in response to the detected acceleration rate.

4. The disk drive according to claim 1 wherein the actuator is a balanced rotary actuator, and wherein the acceleration rate sensor comprises means for detecting angular acceleration rate.

5. The disk drive according to claim 1 wherein the actuator is an unbalanced rotary actuator, and wherein the acceleration rate sensor comprises means for simultaneously detecting angular and linear acceleration rates.

6. The disk drive according to claim 1 wherein the acceleration rate sensor comprises a pair of spaced-apart piezoelectric transducers and an interface circuit coupled to the piezoelectric transducers for generating a first signal proportional to angular acceleration rate and a second signal proportional to linear acceleration rate.

7. The disk drive according to claim 6 wherein the actuator is an unbalanced rotary actuator, and further comprising means electrically coupled to the piezoelectric transducers for generating, from the first and second signals, a signal representative of the angular acceleration rate of the unbalanced rotary actuator.

8. The disk drive according to claim 6 further comprising means coupled to the interface circuit for inhibiting the reading or writing of data when the first or second signals exceeds a predetermined value.

9. The disk drive according to claim 6 wherein the disk drive includes a servo control system responsive to servo positioning information read from the disk for moving the actuator, the servo control system being coupled to the interface circuit and including means responsive to the first or second signals.

10. A data recording disk drive comprising:

a housing:

a data recording disk having tracks for the recording of data;

a motor attached to the housing and connected to the disk for rotating the disk;

a write transducer for writing data to the tracks;

a carrier for supporting the transducer near the surface of the disk;

a rotary actuator attached to the housing and connected to the carrier for moving the carrier and supported write transducer across the tracks and for maintaining the write transducer on a desired track;

an acceleration rate sensor mounted to the housing the sensor comprising a pair of piezoelectric transducers spaced-apart about an axis generally parallel to the axis of rotation of the rotary actuator, each piezoelectric transducer having an electrical lead attached for providing an output current in response to an external force applied to the disk drive;

an interface circuit electrically coupled to the output current leads of the piezoelectric transducers for generating a first signal proportional to angular acceleration rate and a second signal proportional to linear acceleration rate; and means responsive to the output signals of the interface circuit for inhibiting the writing of data by the write transducer.

11. The disk drive according to claim 10 wherein the rotary actuator is an unbalanced rotary actuator, and wherein the first signal from the interface circuit is proportional to angular acceleration rate and the second signal from the interface circuit is proportional to linear acceleration rate.

12. A magnetic recording disk drive comprising:

a magnetic recording disk having tracks for the recording of data, the disk having recorded servo position information;

a motor connected to the disk for rotating the disk;

a head for reading data from and writing data to the data tracks;

a carrier for supporting the head near the surface of the disk;

an acceleration rate sensor for detecting acceleration rate in response to an external force applied to the disk drive;

a voice coil motor rotary actuator connected to the carrier for moving the carrier and supported head across the data tracks and for maintaining the head on a desired data track;

means coupled to the head for generating head position error signals in response to servo position information read from the disk by the head;

a controller coupled to the coil of the actuator and responsive to the head position error signals for generating a control signal to the coil to position the actuator relative to the data tracks, the controller including means for modifying the control signal in response to the detected acceleration rate; and a housing for supporting the motor, actuator, and acceleration rate sensor.

13. The disk drive according to claim 12 wherein the rotary actuator is an unbalanced rotary actuator, and wherein the acceleration rate sensor comprises a sensor for simultaneously sensing angular and linear acceleration rates.

14. The disk drive according to claim 12 wherein the acceleration rate sensor comprises a pair of spaced-apart piezoelectric transducers and an interface circuit coupled between the piezoelectric transducers and the controller for generating a first signal proportional to angular acceleration rate and a second signal proportional to linear acceleration rate.

15. The disk drive according to claim 14 wherein the rotary actuator is an unbalanced rotary actuator, and wherein the controller includes means for generating, from the first and second signals, a signal representative of the angular acceleration rate of the unbalanced rotary actuator.

* * * * *